United States Patent
Best et al.

(10) Patent No.: US 7,748,446 B2
(45) Date of Patent: Jul. 6, 2010

(54) SEISMIC SOURCE AND METHOD OF GENERATING A SEISMIC WAVE IN A FORMATION

(75) Inventors: Bruno Best, Rijswijk (NL); Jörg Ernst Eckerlin, Rijswijk (NL)

(73) Assignee: Shell Oil Company, Houston, TX (US)

( * ) Notice: Subject to any disclaimer, the term of this patent is extended or adjusted under 35 U.S.C. 154(b) by 1237 days.

(21) Appl. No.: 11/038,762

(22) Filed: Jan. 19, 2005

(65) Prior Publication Data

US 2005/0194130 A1  Sep. 8, 2005

(30) Foreign Application Priority Data

Jan. 23, 2004  (EP)  .................. 04100238

(51) Int. Cl.
 *E21B 28/00* (2006.01)
(52) U.S. Cl. ............ 166/177.6; 166/249; 166/104; 175/1; 175/305
(58) Field of Classification Search ........... 166/249, 166/104, 177.6; 175/1, 55, 293, 305; 299/37.2; 173/49
See application file for complete search history.

(56) References Cited

U.S. PATENT DOCUMENTS

| | | | |
|---|---|---|---|
| 3,743,013 A | 7/1973 | Harbonn | 166/0.5 |
| 3,937,599 A | 2/1976 | Thureau et al. | 417/389 |
| 4,410,054 A * | 10/1983 | Nagel et al. | 175/107 |
| 4,483,411 A | 11/1984 | Mifsud | 181/120 |
| 4,514,834 A | 4/1985 | Hanson et al. | 367/141 |
| 4,702,343 A | 10/1987 | Paulsson | 181/106 |
| 4,805,727 A | 2/1989 | Hardee | 181/106 |
| 4,845,982 A | 7/1989 | Gilbert | 73/151 |
| 5,382,760 A | 1/1995 | Staron | 181/121 |
| 6,085,862 A | 7/2000 | Tenghamn | 181/110 |
| 2001/0020218 A1 | 9/2001 | Cosma | |
| 2002/0070368 A1 | 6/2002 | Rountree | 251/30.01 |
| 2003/0116969 A1 | 6/2003 | Skinner | 290/1 |

FOREIGN PATENT DOCUMENTS

| | | |
|---|---|---|
| EP | 1109034 | 6/2001 |
| WO | 82/01738 | 5/1982 |

* cited by examiner

*Primary Examiner*—David J Bagnell
*Assistant Examiner*—Brad Harcourt

(57) ABSTRACT

A Seismic source comprising an actuator having a rotary part (104) and a reciprocative part (105), conversion means (109) in the form of corrugated surfaces to convert a rotation of the rotary part (104) into a reciprocal movement of the reciprocative part (105), and a vibrator body (106) that is connected to the reciprocative part (105) of the actuator by means of a spring (107).

22 Claims, 10 Drawing Sheets

SEISMIC SOURCE AND METHOD OF GENERATING A SEISMIC WAVE IN A FORMATION

BACKGROUND OF THE INVENTION

The present invention relates to a seismic source, in particular a down-hole seismic source, comprising an actuator. The present invention further relates to a method of generating a seismic wave in a formation.

A down-hole seismic source is described in U.S. Pat. No. 4,702,343. This down-hole seismic source is provided with a vibrator body in the form of a clamping plate which is brought into contact with an inside wall of a subterranean bore hole by means of radially directed pistons. The pistons are operated by means of a hydraulic fluid. In order to excite a seismic wave, the clamping force exerted by the pistons can be varied in a pulsating mode by operating a servo control valve that actuates the pistons. The servo control valve is controlled by a signal and power from surface passing through an electric line, for generation of which signal an electric oscillator is required.

SUMMARY OF THE INVENTION

It is an object of the invention to obviate the need of an electric oscillator.

In accordance with the invention, there is provided a seismic source comprising an actuator having a rotary part and a reciprocative part, conversion means to convert a rotation of the rotary part into a reciprocal movement of the reciprocative part, and a vibrator body that is connected to the reciprocative part of the actuator by means of a spring.

The oscillatory source is based on mechanical rotation, for which the rotary means can be located down hole a subterranean bore hole. Since oscillation is generated by rotation, there is no need of an electric oscillator.

In use, the vibrator body can be brought in contact with an earth formation. The spring serves as a resilient means to accommodate the amplitude of the reciprocative part to avoid damage to the seismic source and/or the earth formation.

Frequency control of the reciprocating motion is achieved by controlling the rotary speed of the rotary part, which can be controlled by a relatively slowly varying signal compared to the oscillation frequency.

The reciprocative motion can be a linear reciprocative motion. The conversion of rotation into reciprocative motion preferably includes frequency coupling between the reciprocative part and the rotary part.

Advantageously, the conversion means comprises mechanical interaction means arranged to mechanically convert the rotation of the rotary part into the reciprocal movement of the reciprocative part. Because of the mechanical conversion, the reciprocative part can be driven by a high force, and thus a high power can be transmitted to the reciprocating motion of the reciprocative part. The achievable power is at least higher than in the case of valved pulsating of the piston pressure as in the prior art described in U.S. Pat. No. 4, 702, 343.

In the context of this specification the spring can be any kind of elastic body, but in an advantageous embodiment the spring is a liquid spring. Such a liquid spring may comprise a pressure chamber filled with a liquid, whereby relative movement of the reciprocative part with respect to the vibrator body causes compression or decompression of the liquid. Herewith, a suitable stiff spring is provided. Moreover, a liquid spring has as an advantage that its pressure can be changed in order to adjust a biasing force.

A drive means, in particular a hydraulic motor, can be arranged to drive the rotation of the seismic source rotary part.

The invention also provides a method of generating a seismic wave in a formation, wherein an actuator is driven, whereby driving the actuator comprises driving a rotary part into rotary movement and converting the rotary movement into reciprocative movement of a reciprocative part, and transferring energy of the reciprocative movement into the formation via a spring.

BRIEF DESCRIPTION OF THE DRAWINGS

The invention will be described hereinafter in more detail and by way of example, and more embodiments will be described hereinafter, with reference to the accompanying drawings in which.

DETAILED DESCRIPTION OF THE PREFERRED EMBODIMENT

Figure 1:
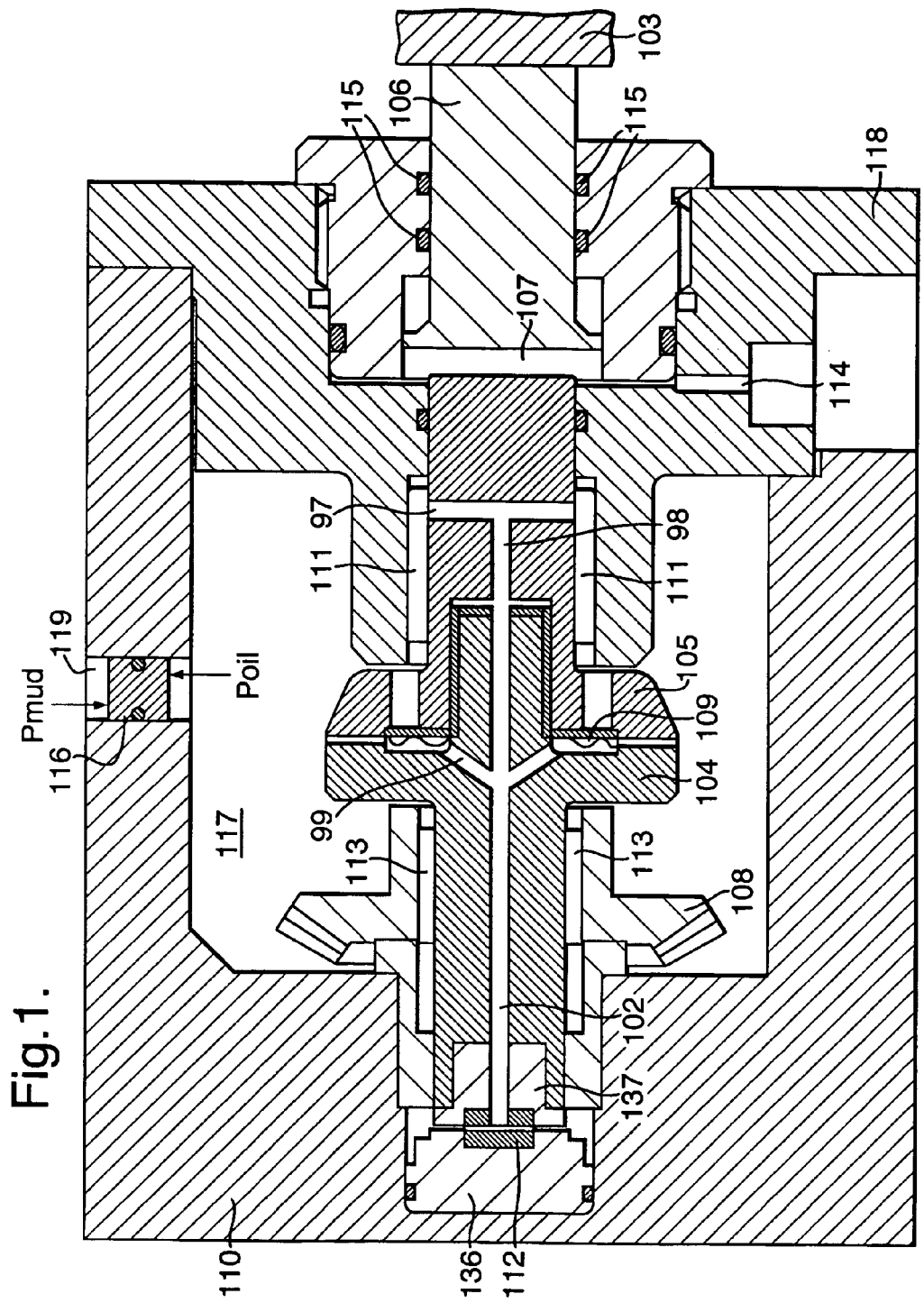
FIG. 1 is a schematic cross section of a down-hole seismic source according to one embodiment of the invention.

FIG. 1 shows in schematic cross section an embodiment of a seismic source in contact with a subterranean formation 103. An actuator is provided, having a rotary part 104 and a reciprocative part 105, and a vibrator body 106. The vibrator body 106 is connected to the reciprocative part 105 by means of a spring 107. The spring 107 is here embodied as a liquid spring 107. The rotary part 104 may be connected to any kind of rotary driving motor (not shown), preferably a fluid-driven hydraulic motor, optionally via a drive-gear mechanism. A preferred hydraulic motor arrangement for driving the seismic source will be described in detail down below.

In the embodiment of FIG. 1, the rotary part 104 is driven via a conical meshing wheel 108 to allow an orthogonal drive axis of the motor relative to the rotary axis of the rotary part 104. Other drive arrangements, such as involving for instance linear meshing wheels or chain or belt transmissions, can be selected depending on the specific design constraints of an individual case.

The rotary part 104 is supported by bearings 112, preferably diamond thrust bearings, which are embedded in a support piece 136. The bearings 112 and the support piece 136 will be described in more detail later in this specification. A central channel 102 is provided in the rotary part 104, which runs essentially coaxial with the rotary axis of the rotary part 104. This channel may be provided in the form of a central bore. The purpose of this channel will be illustrated below.

A force exerted on the housing 110 toward the formation 103 results in the vibrator body 106 pushing against the formation 103, causing the reciprocative part 105 to be pressed against the rotary part 104 via the liquid spring 107. The rotary part is axially supported in the housing 110 by the bearings 112.

The conical meshing wheel 108 is coupled to the rotary part 104 via a spline coupling 113 allowing for some axial play between the rotary part and the conical meshing wheel 108. Herewith it is achieved that axial displacement of the rotary part 104, for instance resulting from wear on the bearings 112, can be accommodated without causing the drive mechanism to jam.

The reciprocative part 105 is coupled to the housing 110 of the actuator by means of a spline section 111, allowing an axial sliding movement of the reciprocative part 105 relative to the housing 110.

The rotary part 104 and the reciprocative part 105 are provided with conversion means in the form of corrugated coupling surfaces 109 have profiles that substantially lie in a plane perpendicular to the axis of rotation of the rotary part 104. The corrugated coupling surfaces 109 are slidably arranged with respect to each other.

The corrugated coupling surfaces 109 can be provided on separate crown pieces that are mounted onto the rotary part 104 and the reciprocative part 105, or they can be machined directly on these rotary and reciprocative parts. In order to generate a preferred seismic waveform, at least one of the coupling surfaces 109 is corrugated with sinusoidal profile. It is understood that any one of the coupling surfaces, or both of them, can have a sinusoidal profile.

The actuator is immersed in a functional fluid, suitably an oil, for lubrication and/or cooling of the moving parts, notably including one or more of the bearing surfaces 112 and the corrugated coupling surfaces 109. The functional fluid is held in a cavity 117 formed by housing 110 and end piece 118. Pressure balancing means can be provided to balance the pressure of the functional fluid (Poil) against the ambient pressure (Pmud). As an example, a pressure communication channel 119 is provided that connects the cavity 117 with the ambient, for instance a subterranean borehole, to allow the pressures Poil and Pmud to assume the same value. A separator body 116 may be provided inside the pressure communication channel 119 to avoid intermixing of the oil and the ambient. The separator body 116 may be a flexible wall, in the form of piston element slidably arranged in the cylindrical bore 119 or a membrane wall (not shown).

Figure 2:
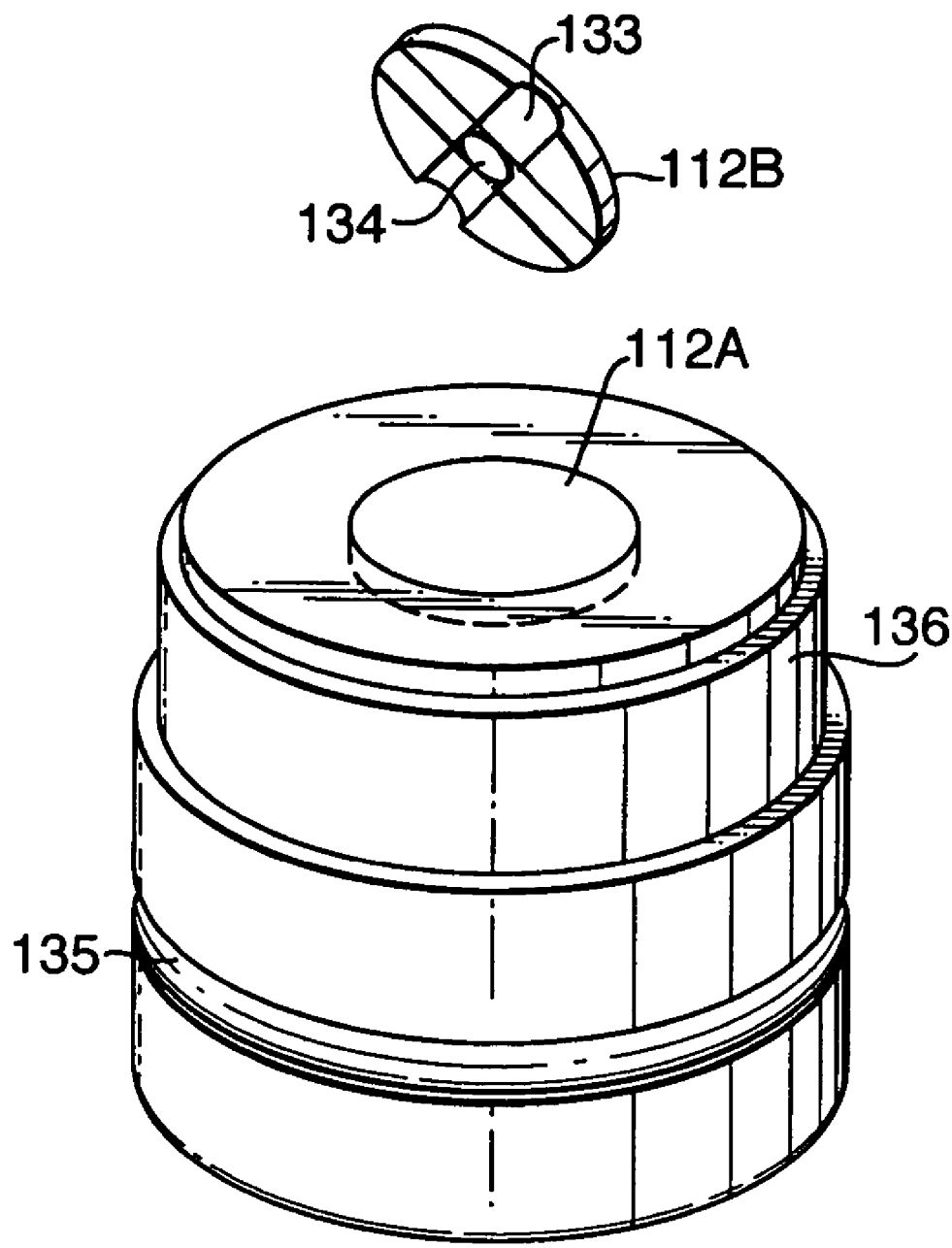
FIG. 2 is a schematic view of a bearing support for use in the seismic source of FIG. 1.

FIG. 2 shows a detailed view of the bearing support piece 136 holding a first bearing piece 112A of a pair of diamond thrust bearings which may comprise polycrystalline diamond compact (PDC) material. The support piece 136, which fits with seal 135 in a bore provided in the housing 110, is formed of material having a high thermal conductivity, such as brass for example, to support cooling of the bearing piece 112A. The second bearing piece 112B is to be connected to the rotary part 104, preferably also by means of a thermally conducting support piece 137 (shown in FIG. 1).

Referring to FIG. 2 and FIG. 1, a central hole 134 is provided in the second bearing piece 112B, which is to be aligned with the central bore 102 in the rotary part 104. One or more grooves 133 are provided in the surface of the second bearing piece 112B that is to face, and engage with, the first bearing piece 112A.

When the two bearing pieces are in engagement, the one or more grooves 133 each form a channel to establish fluid communication between the central hole 134 and the ambient of the bearing pieces 112 in the vicinity of their periphery. As will be further explained below, the one or more grooves are provided to suck up functional fluid from the housing cavity 117. Alternatively, the one or more grooves may be provided in the first bearing piece 112A instead of, or in addition to, the grooves 133 provided in the second bearing piece 112B.

Referring now to FIG. 1, it can be seen that the central bore 102 branches into one or more channels 99 each having a radial component with respect to the rotary axis of the rotary part 104. These channels 99 debouche in a gap between the rotary part 104 and the reciprocative part 105, which gap leads to the corrugated coupling surfaces 109. As will be further explained below, the one or more channels 99 are provided as injection means for injecting the functional fluid 117 between the corrugated coupling surfaces 109.

The central channel 102 in the reciprocative part 104 fluidly connects also to a central channel 98 provided in reciprocative part 105. The central channel 98 branches into one or more channels 97 which debouche between the splines in spline section 111.

Figure 3:
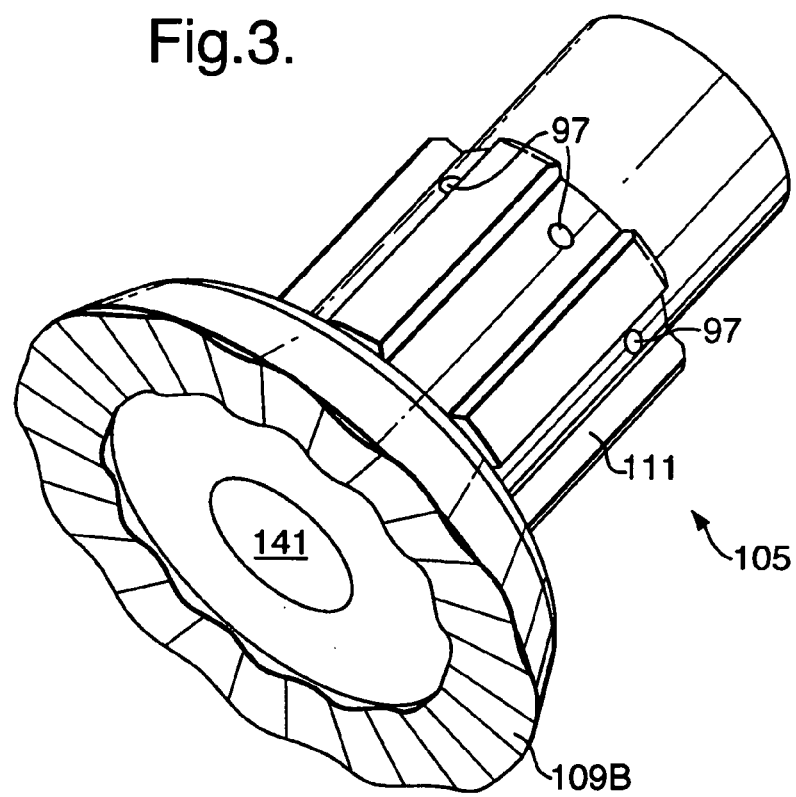
FIG. 3 is a schematic view of an actuator for the seismic source of FIG. 1.
Figure 3:
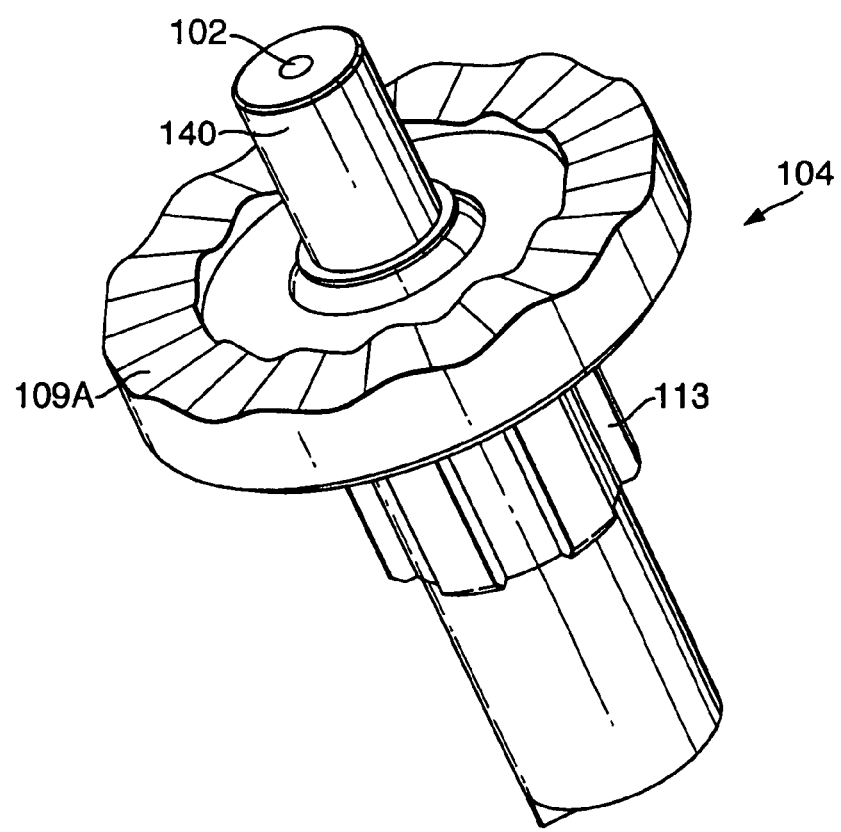

FIG. 3 shows individual views of the rotary part 104 and reciprocative part 105 of the seismic source of FIG. 1. An open end of the central channel 102 in the rotary part 104 is visible, as well as open ends of the one or more channels 97 debauching between the splines 111 of the reciprocative part 105. The coupling surface 109A of the rotary part 104 has a sinusoidal profile in the circumferential direction around the rotary axis. The amplitude of this profile is larger than that of the circumferential sinusoidal profile of the coupling surface 109B of the reciprocative part 105. In other words, the profiles of the coupling surfaces 109 do not fully match each other. In this way, there always remains areas with a gap between parts of the coupling surfaces 109, which can hold some of the functional fluid for lubrication and/or cooling purposes.

The spline section 111 prevents rotation of the reciprocative part 105 inside the housing 110. Because of the mechanical interaction of the corrugated coupling surfaces 109, a rotation of the rotary part 104 is converted into a reciprocal movement of the reciprocative part 105. Still referring to FIG. 3, the rotary part 104 is provided with a shaft end 140 which is to be slidingly inserted into a receiving bore 141 that is provided in the reciprocative part 105. Herewith a proper axial alignment of the rotary part 104 on the reciprocative part 105 is ensured whereby the rotary part 104 is rotatable relative to the reciprocative part 105 while the latter is axially reciprocable relative to the rotary part 104.

The resulting amplitude and oscillatory waveform imposed on the reciprocative part 105 is determined by the profiles of the corrugated surfaces 109. An amplitude lying in a range between 0.01 and 1.0 mm is found suitable for actuating the seismic waves. Preferably, the amplitude is larger than 0.05 mm in order to transmit a high seismic power of more than approximately 1 kWatt. Preferably, the amplitude is lower than 0.6 mm in order to ensure that the force required to drive the reciprocative part 105 is deliverable by the spring without causing damage to the seismic source.

The spring 107 between the reciprocative part 105 and the vibrator body 106 acts as a cushion. It accommodates a difference in reciprocative amplitude between the reciprocative part 105 and the formation 3. Moreover, the spring 107 provides a biasing force on the reciprocative part 105 to keep it against the rotary part 104.

In the embodiment of FIG. 1, the spring 107 is a liquid spring, comprising a pressure chamber. The reciprocative part 105 and the vibrator body 106 slidably reach into the pressure chamber. A bore 114 through the end piece 118, or any other channel, fluidly connects to the pressure chamber, for enabling controlled supply and discharge of a spring liquid to and from the pressure chamber.

A relative movement of the reciprocative part 105 with respect to the vibrator body 106 causes compression or decompression of the spring liquid, which results in a spring stiffness depending on the volume of the pressure chamber and the compressibility modulus of the spring liquid. Stiffness is a measure in units of force over units of length, and is defined as the force required to achieve a certain amount of shortening of the spring by compressing it.

A high-pressure pump (not shown), optionally separated from the pressure chamber 107 by means of a check valve (not shown), is connected to the bore 114 for pressurizing the spring liquid inside the chamber 107. Herewith a base pressure of the spring liquid inside the pressure chamber 107 can be established, for pre-loading of the vibrator body 106 against the formation 103 and bringing the corrugated coupling surfaces 109 into mechanical engagement with each other and keeping them into mechanical engagement throughout operation. Bore 114 and the high-pressure pump thus function as adjustment means for varying the stiffness of the spring 107.

Advantageously, the high pressure pump is driven by the same motor as the rotary part 104. This way, the pressure in the liquid spring 107 is increased in concert with the rotary frequency of the rotary part 104.

The liquid for the liquid spring may be any liquid, in particular it may comprise one of the group of water, oil, silicone gel, transducer gel for ultrasonic echoscopy. Compared to water, oil and silicone gel tend to have a compressibility of approximately 0.5, whereas the transducer gel for ultrasonic echoscopy, with a compressibility of approximately 4, is an example of a spring liquid having a compressibility higher than that of water.

In operation, by rotating the rotary part 104, the reciprocative part 105 will start vibrating in an axial direction against the spring 107 as a result of the corrugations in the corrugated coupling surfaces 109. Spring 107 transmits the reciprocating motion of the reciprocative part 105 into an oscillatory actuated force onto the formation 103. In this way, the internal forces in the seismic source and the external forces exerted on the formation 103 can be kept within limits to prevent damage to the seismic source and the formation 103. Due to mechanically driving the reciprocative part 105, a high seismic power can be transmitted.

The seismic source produces a well-defined seismic waveform of a controlled frequency as long as the corrugated coupling surfaces 109 remain in contact with each other. The frequency of the reciprocative motion is determined by the rotational speed of the rotary part 104 multiplied by the highest number of corrugations on the coupling surfaces 109. The waveform is determined by the profiles of the coupling surfaces 109. The amplitude is independent of the frequency as long as full engagement of the coupling surfaces 109 is be maintained. This is achieved by ensuring that the spring 107 is sufficiently stiff.

Initially, the force exerted on the coupling surfaces 109 by the spring 107 may preferably be relatively low so as to facilitate the starting up of rotational motion of the rotary part 104 against the friction imposed by the coupling surfaces 109. As the frequency is increased, however, the oscillatory acceleration forces required on the reciprocative part 105 to maintain mechanical contact between the corrugated coupling surfaces 109 also increase. Therefore, it is preferred to increase the spring liquid pressure in the liquid spring 107, in response to an increase in the frequency of the reciprocative part 105. To this end, the high-pressure pump that provides the pressure in the spring chamber 107 is preferably coupled to the rotary part 104 or to the system that drives the rotary part 104 so that the pressure is concertedly increasable with the rotation frequency of the rotary part 104.

The function of the central bores 102 and 98 is illustrated as follows. The rotation of the rotary part 104 relative to the housing 110 drags some of the functional fluid 117 that is present between the corrugated coupling surfaces 109 into rotation as well. As a consequence, that portion of the functional fluid experiences a centrifugal force, resulting in the functional fluid being launched out of the area between the corrugated coupling surfaces 109. This, in turn, creates an under pressure in the area between the rotary part 104 and reciprocative part 105 which drives a circulation of functional fluid from the housing cavity 117, respectively through the one or more grooves 133 provided in the bearings 112, the central channel 102 and the one or more channels 99 back into the housing cavity 117. The circulation as described, facilitates in cooling and possibly also in lubrication of the bearings 112 and the corrugated interaction surfaces. A second circulation path is formed via the central channel 98 and the one or more channels 97 in the reciprocative part 105.

Circulation of the functional fluid is driven, provided that the centrifugal force on the functional fluid between the corrugated interaction surfaces 109 is different from the centrifugal force on the functional fluid in the grooves 133. In the seismic source of FIG. 1, for this reason the corrugated coupling surfaces 109 have a larger peripheral radius than the inlets of the central bore 102.

The seismic source as described above can be run into a borehole on a wireline, or integrated in a drilling assembly.

Figure 4:
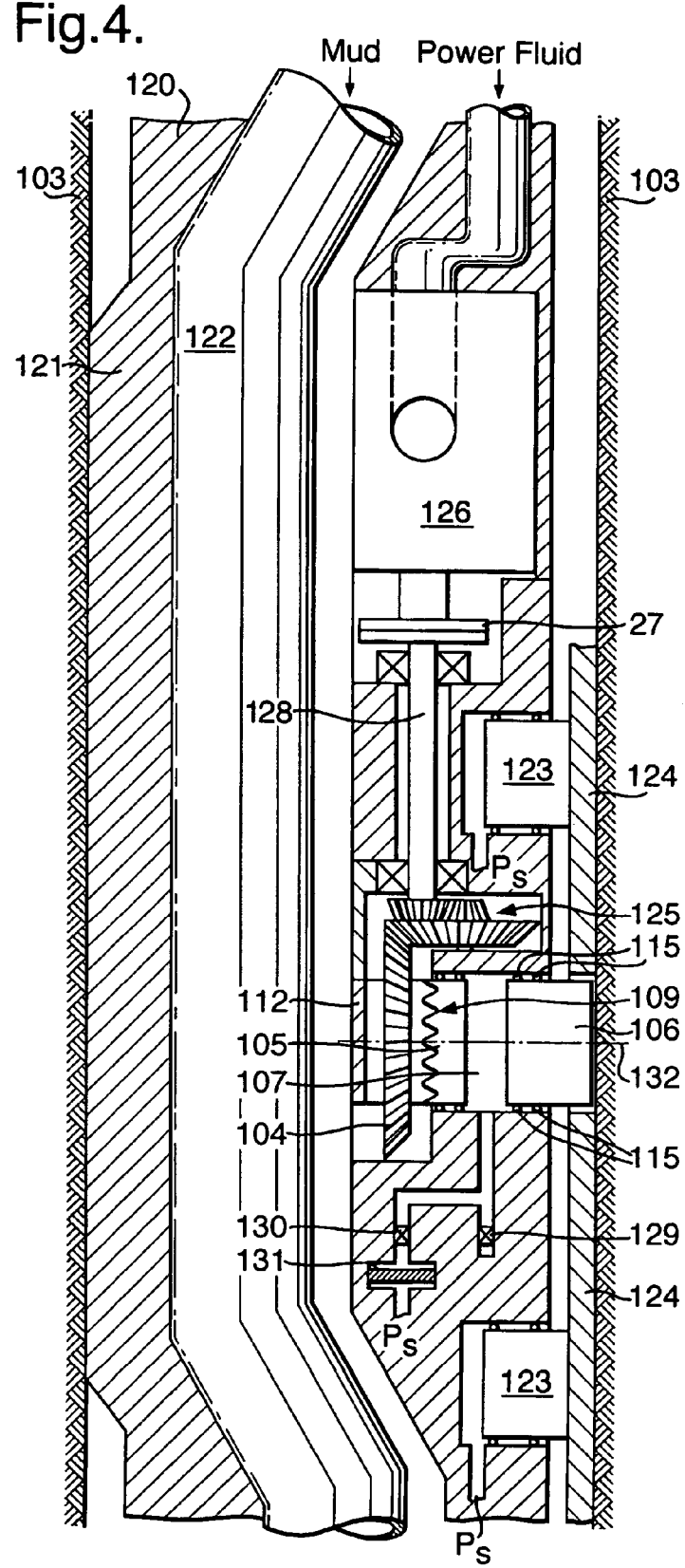
FIG. 4 depicts a schematic cross section of a down-hole seismic source according to another embodiment of the invention and installed in a drill collar.

FIG. 4 schematically shows an embodiment of the seismic source integrated into a drill collar 10. In order to facilitate engagement of the seismic source with the formation 103, a stabilizer rib 121 or any other kind of pad can be provided in the vicinity of the seismic source. In the embodiment of FIG. 4, a separate clamping piston arrangement 123 is provided which can be pressurized using a system fluid under a system pressure $P_s$, resulting in a radial displacement of the clamping pistons 123 into engagement with the formation 103. Optionally, engagement pads 124 can be provided to distribute the clamping force exerted by the clamping pistons 123 over a larger area.

A mud passage 122 is present which bypasses the seismic source. Mud can be fed into the mud passage via "M".

The rotary part 104 of the actuator is driven by a motor housed in housing 126, which motor in this example engages via a clutch 127 and drive shaft 128 with a drive gear 125 based on meshing gear wheels. The clutch is optionally provided to allow the coupling to slip in case of a jam. The motor is powered via a pressurized fluid "PF".

The liquid spring 107 is pressurized using the system pressure and a hydraulic piston arrangement 131. A valve 129 is provided for filling the liquid spring 107 with a suitable liquid, and check valve 130 is provided to enclose the pressure chamber of the liquid spring 107 against cyclic overpressure induced by the reciprocative movement of the reciprocative part 105. Seals 115 slidably engage against the vibrator body 106.

In the embodiment of FIG. 4, the rotary axis of the rotary part 104 and the reciprocative axis 132 both lie in an direction orthogonal to the drill string axial direction.

Figure 5:
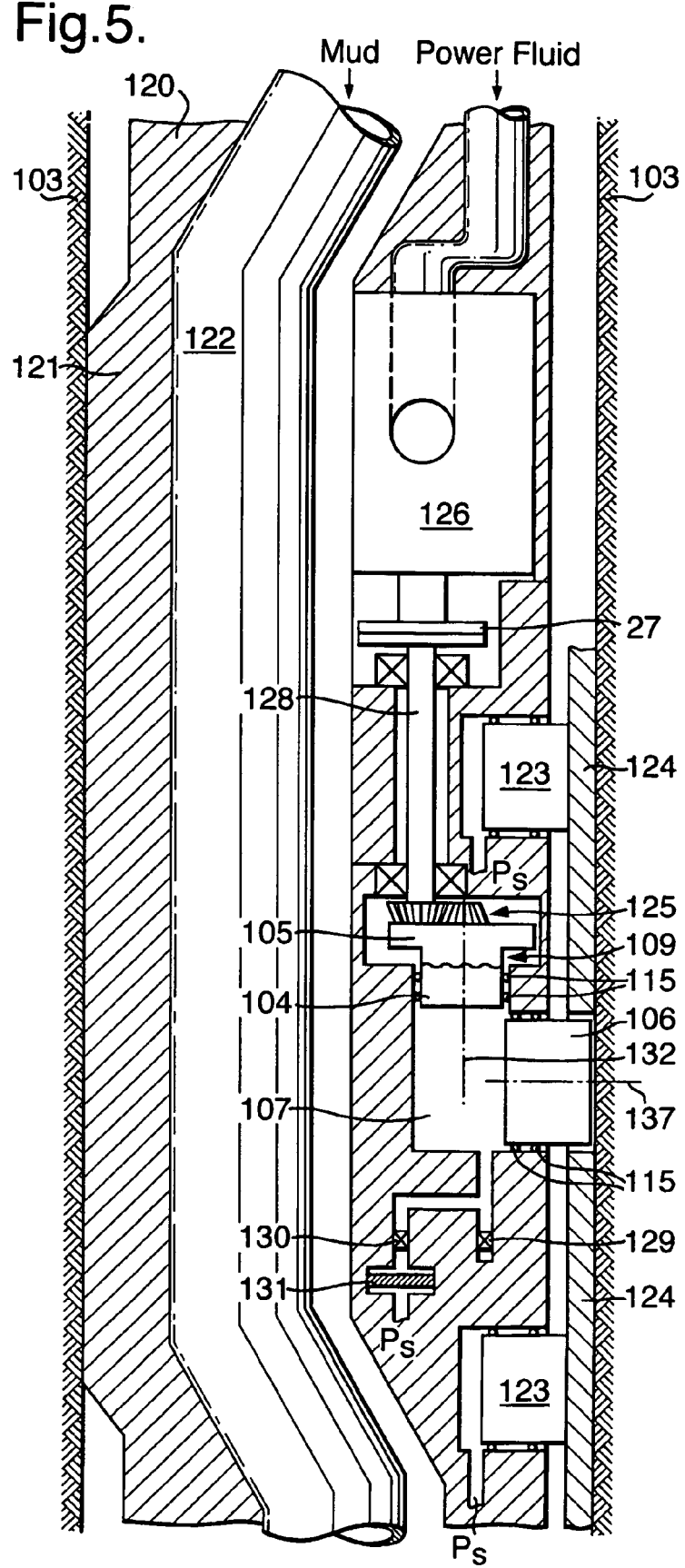
FIG. 5 depicts a schematic cross section of a down-hole seismic source according to still another embodiment of the invention and installed in a drill collar.

An attractive alternative arrangement to the one shown in FIG. 4 is schematically depicted in FIG. 5. The sliding axis 137 of the vibrator body 106 is arranged orthogonal to the drill string like is the case in FIG. 4, in order to engage with the formation 103 on the bore hole wall and transmit seismic p-waves into the formation transverse to the bore hole. The main difference with the embodiment of FIG. 4, is that in FIG. 5, the rotary axis of the rotary part 104 and the reciprocative axis 132 are arranged parallel to the axial direction of the drilling assembly which is normally axially arranged in the borehole. The liquid spring 107 serves to divert the direction of the force exerted by the reciprocative part 105 on the vibrator body 106.

This principle can be applied in other embodiments of the seismic source of the invention. It is envisaged that this embodiment is easier to install in a drill string, because the actuator is in many practical embodiments larger in its direction parallel to the rotary axis and reciprocative axis than it is in the orthogonal direction.

The seismic source of the invention is capable of producing between 1 and 5 kwatt of seismic power. Preferably the seismic power is limited to between 1 and 2 kwatt. The frequency ranges from zero up to 5 kHz, but in a seismic study the frequency is preferably selected in a range of between 9 Hz and 2 kHz. The seismic source is particularly suitable for frequencies higher than 90 Hz, more preferably of higher than 0.9 kHz.

In a specific laboratory test using a seismic source in accordance with FIG. 1, the reciprocative part 105 was preloaded against the rotary part 104 by approximately 15 kN, using a liquid pressure in the liquid spring 107 of approximately 80 bar, during starting up of the rotation until a frequency of approximately 50 Hz was reached. While further increasing the frequency to 1.5 kHz, the load on the reciprocative part 104 was increased to approximately 40 kN by dynamically increasing the pressure in the liquid spring to approximately 200 bar. The corrugated coupling surfaces 109 were provided with a profile containing 22 sinusoidal corrugations. Thus, to obtain a frequency of 1.5 kHz, the rotary part 104 was rotating at some 4000 rpm.

Any suitable drive means may be utilized for driving the rotary part 104 into rotation. A preferred hydraulic motor arrangement for driving the seismic source as described above, is nevertheless shown in FIG. 6 to 10.

Figure 6:
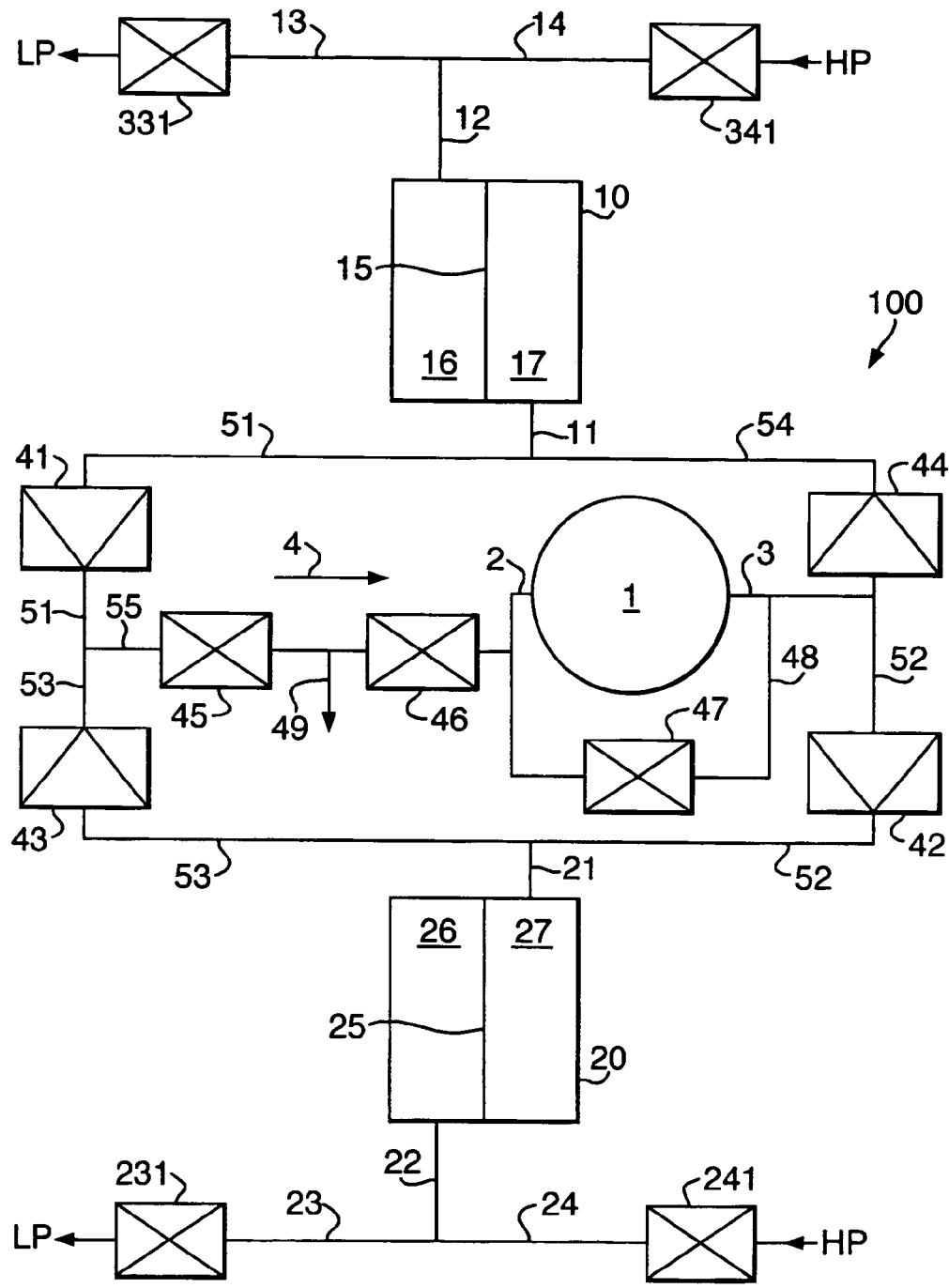
FIG. 6 is a schematic overview of a hydraulic motor arrangement for driving the seismic source.

FIG. 6 shows a hydraulic motor arrangement comprising a hydraulic motor 1, which in this case is a rotary motor, which can be coupled to the rotary part 104 for driving it into rotation. Other types of hydraulic motors may be used as well. The hydraulic motor 1 is drivable by passing a drive liquid under pressure from inlet channel 2 through the hydraulic motor 1 to outlet channel 3. The hydraulic motor 1 is incorporated in an expel system which, in the embodiment of FIG. 1, includes a bridge manifold 100 for directing the flow of the drive liquid through the hydraulic motor 1. Further details of the bridge manifold 100 will be elucidated later in this specification.

The hydraulic motor arrangement is further provided with a first expel reservoir 10, and a second expel reservoir 20. The first expel reservoir 10 is arranged to hold the drive liquid that is to be passed through the hydraulic motor 1. The expel reservoir 10 is for this purpose fluidly connected to the bridge manifold 100 via a channel 11. The expel reservoir 10 is further connected to channel 12, which branches into a working fluid discharge line 13, and a working fluid supply line 14. Valve 331 is provided in working fluid discharge line 13, and valve 341 is provided in the working fluid supply line 14.

The second expel reservoir 20 is arranged to receive the drive liquid that has been passed through the hydraulic motor 1. This expel reservoir 20 is therefore fluidly connected to the bridge manifold 100 via channel 21. The second expel reservoir 20 is further connected to channel 22, which branches into a working fluid discharge line 23, and a working fluid supply line 24. Valve 231 is provided in working fluid discharge line 23, and valve 241 is provided in the wording fluid supply line 24.

Lines 14 and 24 thus form a supply manifold which can be fluidly connected to a pressurized working fluid supply. The valves 341 and 241 make it possible to select which of the first or second expel reservoirs is exposed to the pressurized working fluid.

Lines 13 and 23 debouche into a low pressure zone LP where the fluid pressure is lower than that of the pressurized working fluid. Valves 331 and 231 determine which of the expel reservoirs is exposed to the low pressure zone LP.

The bridge manifold 100 fluidly connects channel 11 to channel 21. Channel 11 branches into a line 54 provided with a check valve 44 in blocking direction, and into a line 51 provided with a check valve 41 in flow direction. Following line 51 through the check valve 41, the line branches into lines 53 and 55. Line 53 is provided with check valve 43 in blocking direction. Line 51 connects to line 2 leading to the hydraulic motor 1. Line 55 is provided with a valve 45 which can be opened or closed, and choke 46, both in series. Choke 46 is a variable flow restriction device.

An optional auxiliary line 49 is provided downstream valve 45 and upstream choke 46. This auxiliary line can be connected to the seismic source for triggering or activating the seismic source as a result of pressurizing line 49 prior to driving the hydraulic motor 1. For instance, the auxiliary line may be connected to pressurize a clamping piston arrangement 123 such as is shown in FIG. 4, resulting in a radial displacement of the clamping pistons 123 into engagement with the formation 103. Or the auxiliary line may be connected to pressurize the liquid spring 107 of the seismic source.

Line 3, downstream the hydraulic motor 1, branches into line 54 on the other side of check valve 44 mentioned above with respect to channel 11, and into line 52 which is also provided with a check valve 42. Both check valves 44 and 42 are in flow direction. However, due to the pressure loss in the hydraulic motor 1, there will be a pressure differential across check valve 44 preventing flow through that check valve. Flow through line 52 is possible, and downstream check valve 42 the line branches into lines 53 and 21. Line 53 is provided with a check valve 43 in flow direction, but since downstream check valve 43 line 53 is in fluid communication with line 51 which is upstream the hydraulic motor 1, the pressure differential across check valve 43 will prevent passage.

To prevent the hydraulic motor 1 from being damaged by its own inertia, a safety valve 47 can be applied as shown in FIG. 6, in a bypass line 48 shorting the hydraulic motor 1 by connecting the inlet line 2 and outlet line 3. The safety valve can be a check valve, blocking flow from line 2 to line 3 and allowing flow from line 3 to line 2. Herewith it is achieved that, in case hydraulic motor 1 is in motion while the pressure differential across the hydraulic motor 1 is not sufficient to drive it, the hydraulic motor 1 can drive circulation of the drive liquid through the bypass line 48.

The function of the bridge manifold 100, is to ensure that the drive liquid always flows in the direction of arrow 4 through line 55, no matter which one of the expel reservoirs 10 or 20 is pressurized.

Figure 7:
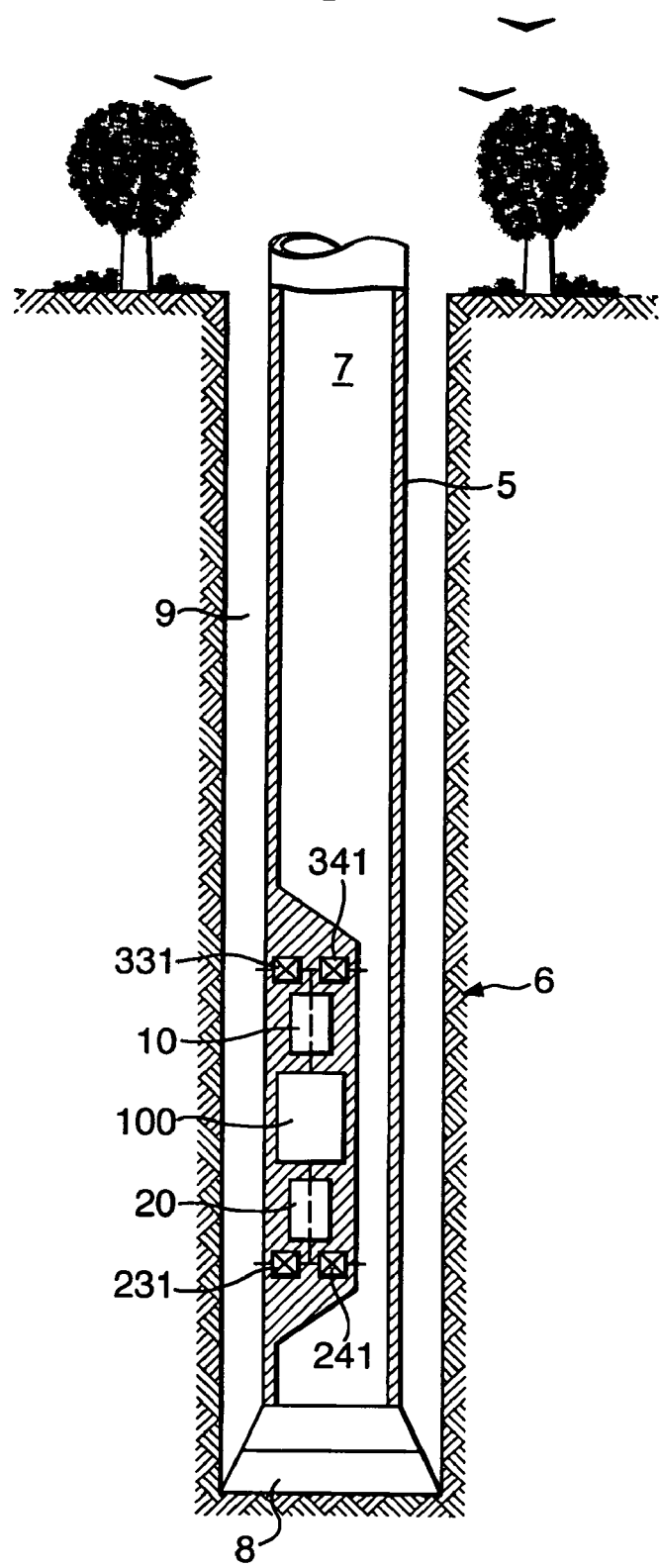
FIG. 7 is a schematic diagram of the hydraulic motor arrangement adopted inside a drill collar.

In a preferred embodiment, the hydraulic motor arrangement is suitable for being suspended in a subterranean bore hole and/or for being contained in a drill string. As an example, the hydraulic motor arrangement of FIG. 6 is installed in a drill string 5 reaching into a subterranean borehole 6 containing drilling mud, as schematically depicted in FIG. 7. The drilling mud can be circulated in a conventional way, wherein the drilling mud is pumped at the surface into a conduit 7 formed by the drill string 5, released into the borehole via an opening near the bottom end 8 of the drill string, and led back to the surface via an annular space 9 between the borehole wall and the drill string 5. Lines 14 and 24 (FIG. 6) are fluidly connected, via valves 341 and 241, to the drilling mud inside the drill string conduit 7, whereas lines 13 and 23 (FIG. 6) are fluidly connected, via valves 331 and 231, to the annular space 9.

In operation, the hydraulic motor arrangement of FIG. 6 works as follows. In an initial condition, expel reservoir 10 holds a good amount of drive liquid, and expel reservoir 20 holds an approximately similar amount of drilling mud. Valves 331, 341, 231, 241, 45, and choke 46 are closed. Drilling mud is circulated as described above, resulting in a pressure differential between the drilling mud pressure inside drill string conduit 7 and the drilling mud pressure in the annular space 9. Thus, the drill string conduit 7 is the high-pressure side HP of the hydraulic motor arrangement, and the annular space 9 is the low-pressure side LP.

Valve 341 is opened, thereby fluidly connecting expel reservoir 10 to the drill string conduit 7. Opening valve 341 will expose the drive liquid in reservoir 17 to the inner drill string pressure at no flow. Then valve 231 is opened, thereby connecting expel reservoir 20 to the annular space 9. Opening valve 231 will enforce the annulus pressure at no flow.

Opening valve 45 will deliver pressure to optional auxiliary line 49, at limited flow to trigger or activate the optional auxiliary apparatus, prior to driving the hydraulic motor 1. Gradually opening choke 46 will create an increasing flow of drive liquid from expel reservoir 10 to expel reservoir 20 (via lines 11, 51, 55, 2, 3, 52, and 21 respectively, as explained above), until the driving fluid has been displaced and expelled from the expel reservoir 10 by the pressurized drilling mud entering the expel reservoir 10 as the working fluid, and until the drilling mud has been displaced and expelled from the expel reservoir 20 by the drive liquid entering the expel reservoir 20. Controlling the choke 46 thus controls the operation of the hydraulic motor. By closing all the valves, and opening valves 241 and 331 instead of 341 and 231, the hydraulic motor arrangement can be operated again, whereby drilling mud is received by expel reservoir 20, thereby displacing and expelling the drive liquid via respective lines 21, 53, 55, 2, 3, 54, and 11 into expel reservoir 10 again.

This cycle can be repeated.

Figure 8:
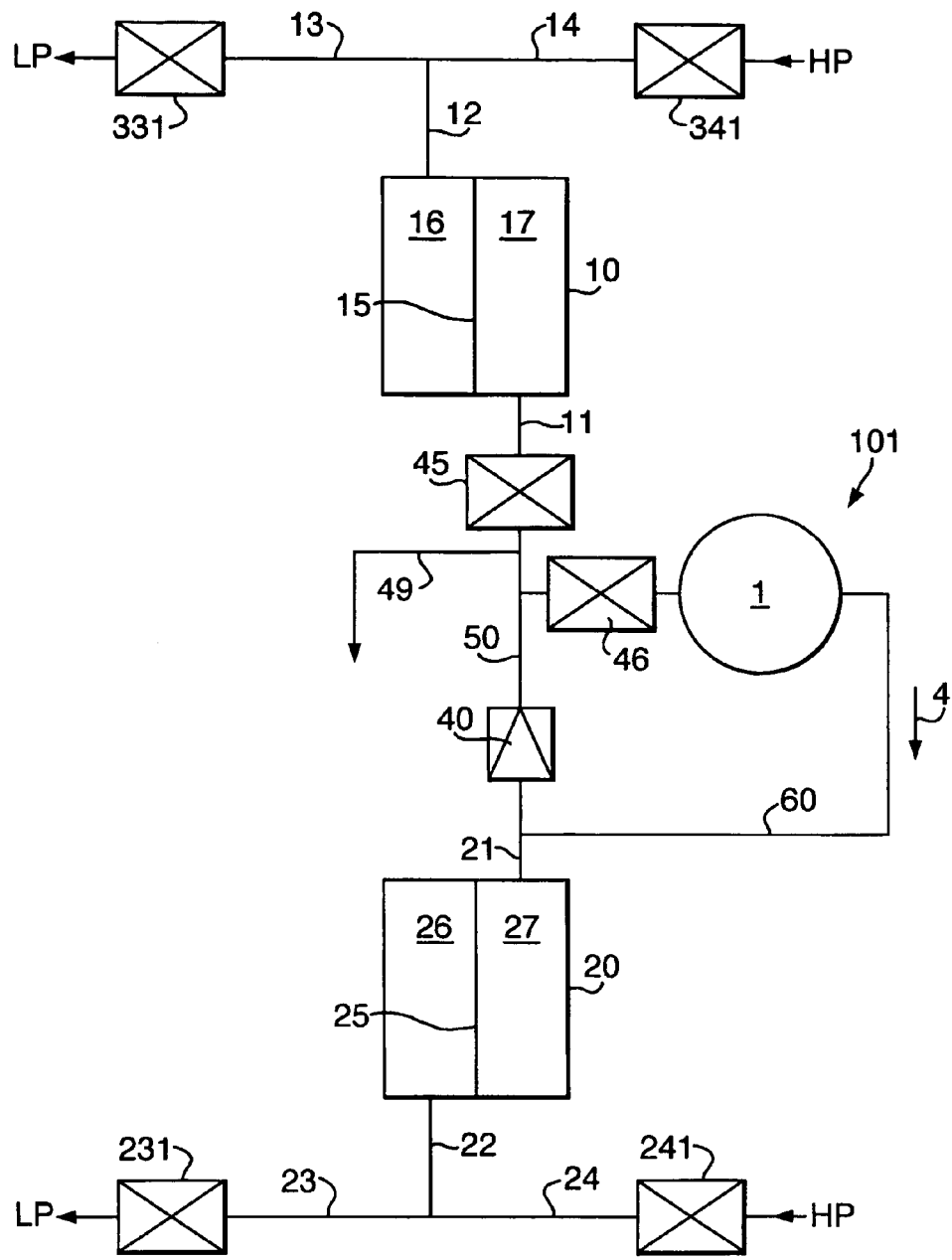
FIG. 8 is a schematic overview of the hydraulic motor arrangement according to another embodiment.

FIG. 8 shows an alternative hydraulic motor arrangement, having an expel system with a simpler manifold 101 than the bridge manifold 100 of FIG. 6. Manifold 101 is based on one check valve 40.

Like FIG. 6, the hydraulic motor arrangement of FIG. 8 is provided with first and second expel reservoirs 10 and 20, connected to manifold 101 via lines 11 and 21, respectively. Like in the embodiment of FIG. 5, the second expel reservoir 20 is arranged to receive the expelled drive liquid and, upon receipt thereof, to displace and expel working fluid into the low pressure zone so that the drive liquid can be collected in the second expel reservoir 20, and recirculated through the hydraulic motor arrangement for use in a next cycle.

The manifold 101 comprises line 50 which fluidly connects line 11 with line 12. Line 50 is separated from line 11 by means of valve 45. Check valve 40 is located in line 50 allowing flow in the direction from second expel reservoir 20 to first expel reservoir 10, and blocking flow in the reverse direction. The hydraulic motor 1 is located in line 60 which is arranged to bypass the check valve 40. Line 60 is also provided with a variable flow restriction device in the form of choke 46. Optionally, line 60 may be provided with a check valve for blocking the flow path from the second expel reservoir 20 to the first expel reservoir 10 through line 60.

Similar to the embodiment of FIG. 6, manifold 101 may be provided with optional auxiliary line 49, which in the embodiment of FIG. 8 may connect to line 50 between valve 45 and check valve 40. A bypass line 48, shorting the hydraulic motor 1, including a safety valve 47 can be provided to protect the hydraulic motor 1 in the same way as is shown in FIG. 6.

The expel reservoirs 10, 20, and the supply manifolds and low pressure zones LP can be the same as, or similar to, the ones of FIG. 6. The function of manifold 101, is to ensure that the drive liquid always flows in the direction of arrow 4 through line 60.

The hydraulic motor arrangement of FIG. 7 works as follows. In an initial condition, expel reservoir 10 holds a good amount of drive liquid, and expel reservoir 20 holds an approximately similar amount of working fluid, which can be a drilling mud. Valves 331, 341, 231, 241, 45, and choke 46 are initially closed. A pressure differential is established between the HP and the LP zones, for instance in the way described above involving circulation of drilling mud. Valve 341 is opened, thereby fluidly connecting expel reservoir 10 to the working fluid in the high pressure zone HP. Opening valve 341 will expose the drive liquid in reservoir 17 to the pressurized working fluid at no flow. Then valve 231 is opened, thereby connecting expel reservoir 20 to the low pressure zone LP. There is still no flow of the drive liquid.

Opening valve 45 will deliver pressure to optional auxiliary line 49, at limited flow to trigger or activate an optional auxiliary apparatus, prior to driving the hydraulic motor 1. Gradually opening choke 46 will create an increasing flow of drive liquid from expel reservoir 10 to expel reservoir 20 (via lines 11, 50, 60, 50, and 21 respectively), until the driving fluid has been displaced and expelled from the expel reservoir 10 by the pressurized working fluid entering the expel reservoir 10, and until the exhaust fluid has been displaced and expelled from the expel reservoir 20 by the drive liquid entering the expel reservoir 20. Controlling the choke 46 controls the operation of the hydraulic motor.

By closing all the valves, and opening valves 241 and 331 instead of 341 and 231, the hydraulic motor arrangement is reset to its initial condition, after which the cycle can be repeated. Since choke 46 and hydraulic motor 1 impose a flow resistance in line 60, the drive liquid will flow through check valve 40 from expel reservoir 20 back to expel reservoir 10 provided that valve 45 is opened.

The general principle of the hydraulic motor arrangements included in a drill string for instance such as is shown in FIG. 7, is that it is driven by virtue of the pressure differential between the drill string conduit 7 and the annular space 9. Alternatively, a pressure differential can be created within the drill string conduit 7 by provision of a suitable flow restriction, whereby lines 14 and 24 should connect to the drill string conduit 7 upstream of the flow restriction and lines 13 and 23 should connect to the drill string conduit 7 downstream of the flow restriction.

It will be understood that the hydraulic motor arrangement described with reference to FIG. 8 can be installed in a drill string in the same way as shown in FIG. 7. An advantage of the hydraulic motor arrangements described above, is that the drive liquid can be fully optimized for driving the hydraulic motor 1, and the drilling mud can be fully optimized for its purpose as a drilling fluid. Delicate mechanisms such as the choke 46 and the drive mechanism in hydraulic motor 1 are not exposed to the harsh conditions imposed by passing drilling mud.

In the described hydraulic motor arrangement the pressure of the pressurized working fluid is transferred to the drive liquid in the expel reservoir, and then utilized for driving the hydraulic motor. The drive liquid can thus be optimized for its task of driving the hydraulic motor independently from specific requirements of the working fluid. For instance, a clean hydraulic oil that is free of erosive solid particulates can be utilized, which would be unsuitable as a drilling mud but particularly suitable for driving a hydraulic motor.

Another advantage of the hydraulic motor arrangement in accordance with the invention is that it can be operated using a gaseous working fluid even when the hydraulic motor requires a liquid driving fluid.

In order to prevent the drive liquid from being contaminated by the working fluid, a movable wall 15, 25 is provided in the expel reservoirs 10, 20 separating two compartments 16, 17 and 26, 27 in each of the expel reservoirs 10, 20. First compartments 16 and 26 are reserved for receiving and containing the working fluid, and second compartments 17, 27 are reserved for receiving and containing the drive liquid. The movable wall 15, 25 may be provided in the form of a piston means which is slidably arranged in a cylindrical bore which is in fluid communication with the first and second compartments in the expel reservoir concerned.

Alternatively, the movable wall 15, 25 may be provided in the form of a flexible membrane, such as a rubber membrane.

In order to avoid the inlets to the compartments to be blocked by the movable wall, as a result of the wall being forced into the compartment by the load in the compartment, one or both of the compartments may be provided with a porous section to ensure that the inlets are in communication with a good deal of the volume inside the compartments. Such a porous section can for instance be provided in the form of inwardly protruding ribs on the inside walls of the compartments, or in the form of a flexible sponge-like material.

In the preferred embodiments, there is a predetermined fixed amount of drive liquid present in the expel system. In order to avoid the blockage problem in the working fluid compartment, it is possible to provide excess volume in the working fluid compartment such that an amount of the working fluid remains present in the expel reservoir in the situation that a maximum amount of drive liquid is present in the expel reservoir.

The hydraulic motor arrangements as depicted in FIGS. 6 and 8 are suitable for intermittently operating the hydraulic motor 1 during limited periods of time of which the maximum duration is dictated by the volume that is available in the expel reservoirs for exchanging drive liquid. The hydraulic motor arrangements are also particularly suitable for imposing a frequency sweep on the hydraulic motor 1, by gradually opening choke 46.

A quasi-continuous operation of the hydraulic motor 1 is achievable in the embodiment of FIG. 6 by appropriate concerted switching of valves 331, 231, 341, and 241, provided that the hydraulic motor 1 contains sufficient inertia to bridge the switching time.

For a more continuous operation, the hydraulic motor arrangement of FIG. 6 can be modified by providing at least three, and preferably at least four expel reservoirs in a "cyclic star"-arrangement whereby the expel reservoirs for instance go through their cycles with fixed phase differences.

The cycle can be operated again and again, and in this way a continuous flow of driving liquid through the hydraulic motor can be maintained.

Figure 9:
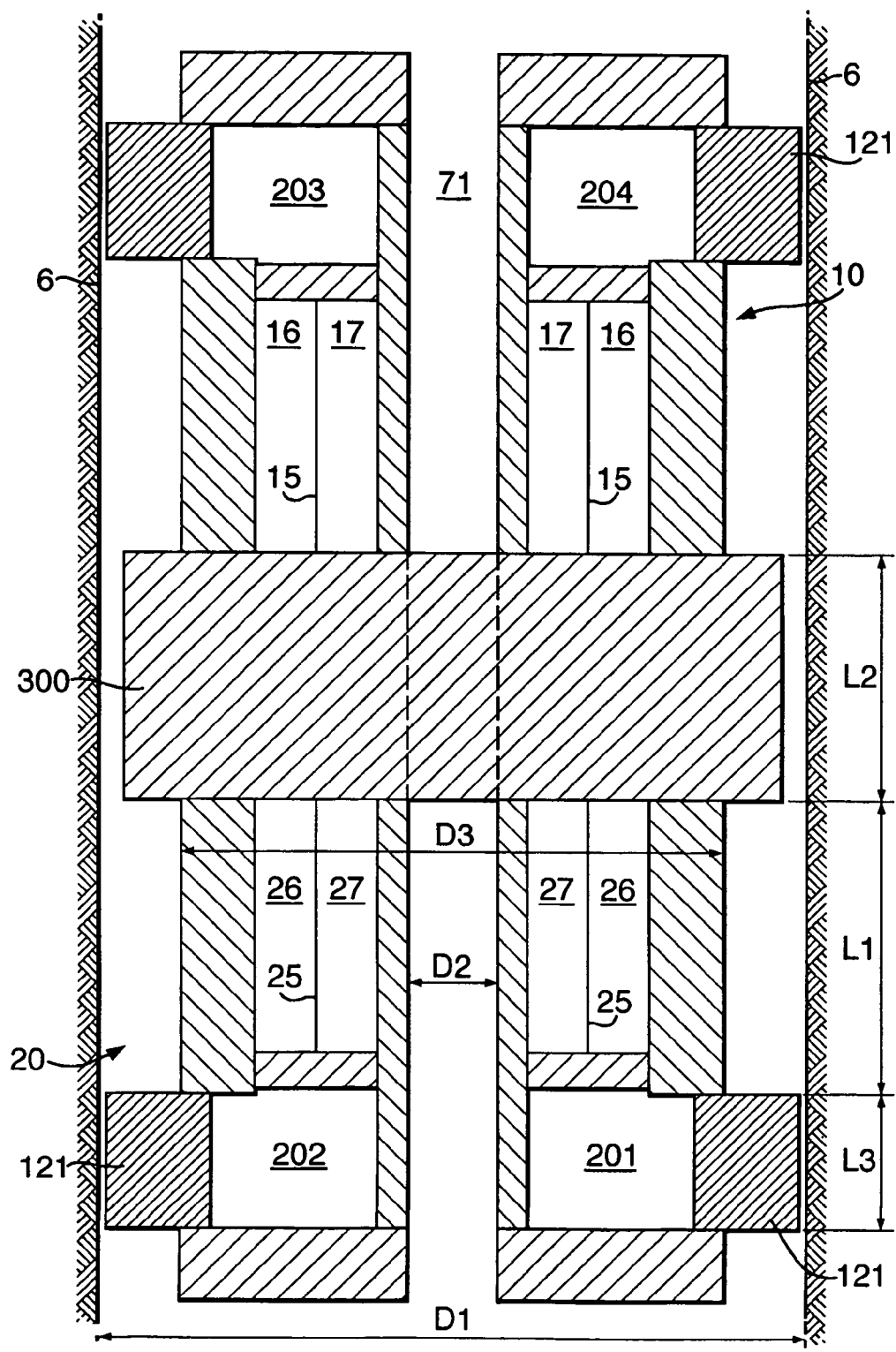
FIG. 9 is a schematic overview of a drill collar provided with the hydraulic motor arrangement.

FIG. 9 schematically shows a preferred embodiment of a hydraulic motor arrangement as a drill string sub, which can be a section of a drill string. The first and second expel reservoirs 10, 20 are disposed upstream and downstream of a unit 300 comprising a hydraulic motor. The expel reservoirs are shaped as a torus around a centrally disposed drilling mud passage 71. Cylindrical membranes 15, 25 separate the respective compartments 16, 26 for working fluid such as drilling mud, from compartments 17, 27 for drive liquid such as hydraulic oil. In this example the outer compartments 16, 26 are assigned as the working fluid compartments and the inner compartments 17, 27 as the drive liquid compartments, but this may be assigned the other way round if so desired.

Compartments 201 to 204 are provided for housing the necessary valve means, and optionally other means such as control electronics and batteries for powering the control electronics and optionally also for powering the valves.

Figure 10:
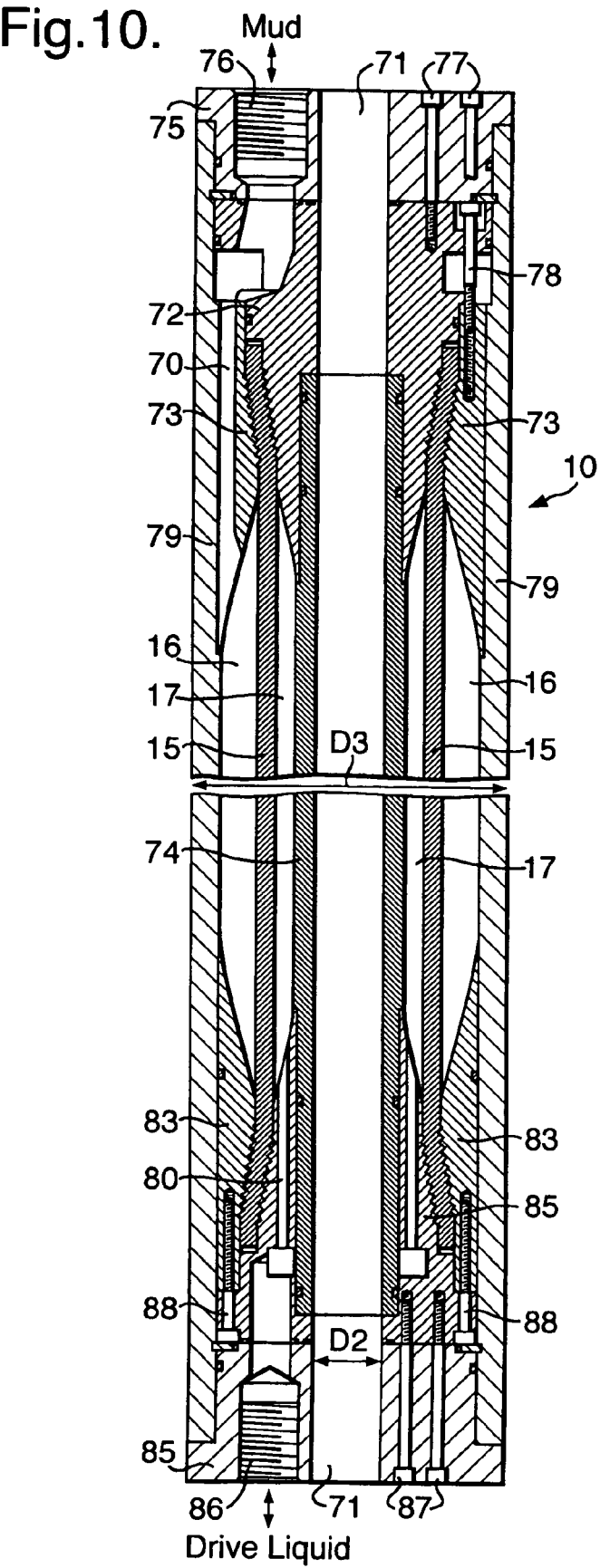
FIG. 10 is a schematic cross section of an expel reservoir for the embodiment of FIG. 9.

FIG. 10 shows a detailed embodiment for the torus shaped expel reservoir 10. This embodiment is also applicable for the expel reservoir 20. In this embodiment, the expel reservoir is arranged inside an outer tube 79, which is sandwiched between a cover body 75 on a mud side and a cover body 85 on a drive liquid side. Cover body 75 is provided with a supply/discharge channel 76 for supplying and discharging working fluid in the form of a drilling mud, and cover body 85 is provided with a supply/discharge channel 86 for supplying and discharging drive liquid. Supply/discharge channels 76 and 86 respectively correspond to lines 12 and 22 as schematically depicted in FIGS. 6 and 8.

Connected to the respective cover bodies 75 and 85 are membrane liners 72 and 82, which are connected by means of fastening means 77 and 87. The cover bodies 75, 85, and the membrane liners 72, 82, are provided with a central bore, which fluidly connects to a central tube 74 to form the centrally disposed drilling mud passage 71 which bypasses the expel reservoirs.

Membrane 15 is clamped between the membrane liners 72, 82 and respective clamping rings 73 and 83 which are connected to their membrane liners 72, 82 by fastening means 78 and 88 such that membrane 15 is held between the membrane liners 72, 82 and the respective clamping rings 73, 83. The membrane liners 72, 82 and/or the clamping rings 73, 83 are preferably provided with corrugated clamping surfaces to axially secure the membrane 15.

A working fluid compartment 16 is formed by the annular space defined between the outer tube 79 and the membrane 15, and a drive liquid compartment 17 is formed by the annular space defined between the inner tube 74 and the membrane 15. The clamping ring 73 on the mud side is provided with a channel 70 that fluidly connects the working fluid compartment 16 with supply/discharge channel 76. Channel 70 can be provided in the form of a bore, but in the embodiment of FIG. 10 it is provided in the form of a groove in the outer periphery of the clamping ring 73 which groove together with the outer tube 79 forms the channel 70.

In a similar way, the membrane liner 85 on the working fluid side is provided with a channel 80 that fluidly connects the drive liquid compartment 17 with supply/discharge channel 86.

The outside wall of the inner tube 74 is provided with annular grooves to avoid the membrane 15 to fully engage with the inner tube and thereby block the channel 80. There is an excess volume reserved in the working fluid compartment 16 as compared to the volume of drive liquid that can be brought into the drive liquid compartment 17 under normal operation, in order to avoid the channel 70 from being blocked by the membrane 15.

Referring to FIGS. 9 and 10, in a practical example, the outer diameter D1 of the stabilizer pads 121 on drill pipe section can be 215 mm suitable for a so-called 8½"-hole. The diameter D2 of the drilling fluid passage 71 can be 38 mm (corresponding to 1½") and the outer diameter D3 of the outer tube 79 can be 170 mm (corresponding to 6¾"). Assuming an axial length L1 of 1 meter, there is space available for approximately 10 liters of drive liquid to exchange between the expel reservoirs 10 and 20. Further assuming a pressure differential of 80 bars between the working fluid supply point and the working fluid discharge point, which is realistic for drilling mud in a subterranean drilling operation, and a flow of 1 liter/second, this hydraulic motor arrangement should be able to deliver 7.8 kWatt for a duration of 10 seconds. Useful seismic data should be obtainable during this amount of time.

The invention claimed is:

1. Seismic source comprising an actuator having a rotary part and a reciprocative part, conversion means to convert a rotation of the rotary part into a reciprocal movement of the reciprocative part, and a vibrator body that is connected to the reciprocative part of the actuator by means of a spring, wherein the conversion means comprises mechanical interaction means arranged to mechanically convert the rotation of the rotary part to the reciprocal movement of the reciprocative part, and wherein the mechanical interaction means comprises first and second corrugated coupling surfaces provided on the rotary part and the reciprocative part, which first and second coupling surfaces are slidably arranged with respect to each other.

2. The seismic source of claim 1, wherein the rotary part and the reciprocative part are frequency-coupled.

3. The seismic source of claim 1, wherein injection means is provided for injecting a functional fluid between the first and second corrugated coupling surfaces.

4. The seismic source of claim 3, wherein the injection means is arranged for injecting the functional fluid in the vicinity of a centre of rotation of the rotary part.

5. The seismic source of claim 3, wherein the injection means comprises a functional fluid recycling loop, arranged to suck up functional fluid after it has been injected, and to re-inject the sucked up functional fluid in the vicinity of the centre of rotation.

6. The seismic source of claim 5, wherein the recycling loop is driven by a pressure difference resulting from centrifugal work exercised on the functional fluid due to the rotation of the rotary part.

7. The seismic source of claim 1, wherein the first and second corrugated coupling surfaces have mutually different corrugation profiles.

8. The seismic source of claim 1, wherein the rotary part is supported by bearing means, the bearing means preferably comprising first and second diamond-comprising surface layers being slidably engaged with each other, and wherein the bearing means are located in the recycling loop.

9. The seismic source of claim 1, wherein the spring has a stiffness sufficiently high to ensure a sliding engagement between the corrugated coupling surfaces.

10. The seismic source of claim 1, further comprising adjustment means for varying the stiffness of the spring.

11. The seismic source of claim 1, adapted for use in a sub surface bore hole.

12. The seismic source of claim 11, wherein the vibrator body is arranged to engage in contact with the bore hole.

13. The seismic source of claim 1, wherein the conversion means is capable of converting the rotation of the rotary part into the reciprocal movement of the reciprocative part having a reciprocation frequency of higher than 9 Hz.

14. The seismic source of claim 1, further comprising drive means for rotating the rotary part.

15. The seismic source of claim 14, wherein the drive means comprises a hydraulic motor.

16. The seismic source of claim 1, wherein the conversion means is capable of converting the rotation of the rotary part into the reciprocal movement of the reciprocative part having a reciprocation frequency of higher than 90 Hz.

17. The seismic source of claim 1, wherein the conversion means is capable of converting the rotation of the rotary part into the reciprocal movement of the reciprocative part having a reciprocation frequency of higher than 0.9 kHz.

18. The seismic source of claim 1, wherein the seismic source is adapted for use in a borehole formed in an earth formation and wherein in use the vibrator body is pressed against a wall of the borehole.

19. The seismic source of claim 18, wherein the spring transmits the reciprocal movement of the reciprocative part into an oscillatory actuated force onto the formation.

20. Seismic source comprising an actuator having a rotary part and a reciprocative part, conversion means to convert a rotation of the rotary part into a reciprocal movement of the reciprocative part, a vibrator body that is connected to the reciprocative part of the actuator by means of a spring, and adjustment means for varying the stiffness of the spring, wherein the adjustment means is controllable in response to a reciprocation frequency of the reciprocative part.

21. The seismic source of claim 1, wherein the spring comprises a pressure chamber filled with a liquid, whereby relative movement of the reciprocative part with respect to the vibrator body causes compression or decompression of the liquid.

22. The seismic source of claim 21, wherein the pressure chamber is connected to a high-pressure outlet of a liquid pump for controlling a base liquid pressure inside the pressure chamber.

* * * * *